United States Patent
Slavov

(10) Patent No.: US 9,122,807 B2
(45) Date of Patent: Sep. 1, 2015

(54) INTERFACING A SWITCH ARRAY

(75) Inventor: Nedyalko Slavov, Zurich (CH)

(73) Assignee: ST-ERICSSON SA, Plan-Les-Quates (CH)

( * ) Notice: Subject to any disclaimer, the term of this patent is extended or adjusted under 35 U.S.C. 154(b) by 388 days.

(21) Appl. No.: 13/808,912

(22) PCT Filed: Aug. 5, 2011

(86) PCT No.: PCT/EP2011/063535
§ 371 (c)(1),
(2), (4) Date: Feb. 5, 2013

(87) PCT Pub. No.: WO2012/017079
PCT Pub. Date: Feb. 9, 2012

(65) Prior Publication Data
US 2013/0290593 A1    Oct. 31, 2013

(30) Foreign Application Priority Data

Aug. 5, 2010 (EP) .................................... 10251400

(51) Int. Cl.
*H03K 17/94* (2006.01)
*G06F 13/38* (2006.01)
*H04Q 3/52* (2006.01)

(52) U.S. Cl.
CPC .............. *G06F 13/385* (2013.01); *H04Q 3/521* (2013.01); *H04Q 2213/1302* (2013.01); *H04Q 2213/1304* (2013.01); *H04Q 2213/13213* (2013.01); *H04Q 2213/13305* (2013.01)

(58) Field of Classification Search
USPC .......................................................... 341/26
See application file for complete search history.

(56) References Cited

FOREIGN PATENT DOCUMENTS

| EP | 1 096 690 A1 | 5/2001 |
| EP | 2 012 431 A1 | 1/2009 |

OTHER PUBLICATIONS

International Search Report issued in corresponding International application No. PCT/EP2011/063535, mailing date Oct. 27, 2011.
Written Opinion of the International Searching Authority issued in corresponding International application No. PCT/ EP2011/063535, mailing date Oct. 27, 2011.

*Primary Examiner* — Brian Zimmerman
*Assistant Examiner* — Thomas McCormack
(74) *Attorney, Agent, or Firm* — Patent Portfolio Builders PLLC

(57) ABSTRACT

An interface circuit for a switch array having an array of switches, each closeable to couple a row conductor of a plurality of row conductors to a column conductor of one or more column conductors, comprises a current generator and a current detector. The current generator has a plurality of row interface ports for coupling to different ones of the row conductors and is arranged to generate a switch array current for coupling to the row interface ports, the switch array current having a different one of a plurality of different switch array current magnitudes for different ones of the row interface ports, and generate one or more reference currents each having a different reference current magnitude. The current detector has one or more column interface ports for coupling to the one or more column conductors and is arranged to detect the switch array current flowing at any one of the one or more column interface ports, and generate a row indication indicative of which of the row conductors a closed one of the switches is coupled to by determining which one of the switch array current magnitudes the detected switch array current has by comparing the detected switch array current with the one or more reference currents.

18 Claims, 10 Drawing Sheets

INTERFACING A SWITCH ARRAY

FIELD OF THE DISCLOSURE

The present disclosure relates to an interface circuit for a switch array, for example for interfacing a keyboard to a processing device, and to a method of operating an interface circuit for a switch array.

BACKGROUND TO THE DISCLOSURE

There is an increasing requirement for a high level of integration of electronic circuits, particularly involving different types of circuitry such as RF circuits, analogue baseband circuits and digital circuits. For example, there is a requirement for a mobile telephone or a television receiver integrated in a single monolithic chip, or in a single package containing more than one chip, to contain circuitry for implementing at least some of the following elements: a fast memory interface, various digital interfaces such as a Universal Serial Bus (USB) and a Inter-Integrated Circuit (IIC) bus, a digital processing unit, analogue and mixed signal blocks, a radio frequency (RF) receiver and transmitter, a power management unit, and peripheral interfaces to devices such as a display, camera and keyboard. Elements having an output with a high voltage swing and a high frequency, such as an RF transmitter, a DC to DC converter or a class D audio amplifier, can cause electrical interference to elements having a sensitive RF input, or a sensitive analogue input, such as a microphone input or a high resolution analogue to digital converter.

To some extent, such electrical interference can be reduced by careful positioning of input and output terminals on a chip or package. For example, a keyboard interface may have a low operating frequency and cause relatively little interference, and therefore the terminals for the keyboard interface may be positioned close to RF input terminals. However, even where a keyboard interface uses a low scanning frequency, high order harmonics may be emitted. To achieve a high performance in an RF receiver, the high frequency emissions coming from a keyboard interface need to be minimised.

Another problem is the RF interference a keyboard interface can experience if its terminals are placed close to an output of an integrated RF transmitter. A high power transmitter may induce spurious signals into high impedance inputs of a keyboard interface, which may cause an undesired operation. Therefore, there is a requirement for a keyboard interface that is insensitive to RF interference and which has low high frequency emissions.

SUMMARY OF THE DISCLOSURE

According to a first aspect, there is provided an interface circuit for a switch array having an array of switches each closeable to couple a row conductor of a plurality of row conductors to a column conductor of one or more column conductors, the interface circuit comprising:

a current generator having a plurality of row interface ports for coupling to different ones of the row conductors and arranged to generate a switch array current for coupling to the row interface ports, the switch array current having a different one of a plurality of different switch array current magnitudes for different ones of the row interface ports, and generate one or more reference currents each having a different reference current magnitude, and a current detector having one or more column interface ports for coupling to different ones of the one or more column conductors and arranged to detect the switch array current flowing at any one of the one or more column interface ports, and generate a row indication indicative of which of the row conductors a closed one of the switches is coupled to by determining which one of the switch array current magnitudes the detected switch array current has by comparing the detected switch array current ($I_M$) with the one or more reference currents.

According to a second aspect, there is provided a method of interfacing a switch array, the switch array having an array of switches each closeable to couple a row conductor of a plurality of row conductors to a column conductor of one or more column conductors, the method comprising:

generating a switch array current for coupling to the plurality of row conductors, the switch array current having a different one of a plurality of different switch array current magnitudes for different ones of the row conductors;

generating one or more reference currents each having a different reference current magnitude;

detecting the switch array current flowing at any one of the one or more column conductors; and generating a row indication indicative of which of the row conductors a closed one of the switches is coupled to by determining which one of the switch array current magnitudes the detected switch array current has by comparing the detected switch array current with the one or more reference currents.

The interface circuit and the method of operating an interface circuit may therefore employ a common switch array current that flows through both the row conductor and the column conductor to which a closed switch is coupled, and which has a magnitude dependent on which one of the row conductors the switch array current is flowing in. The row conductor to which the closed switch is coupled may be determined dependent on the magnitude of the switch array current by comparing the detected switch array current with the one or more reference currents, either directly or indirectly. The interface circuit and the method of interfacing enables static currents to be used, rather than oscillating signals, thereby reducing the emission of electrical interference. When none of the switches is closed, the switch array current may not flow, thereby reducing electrical interference and power consumption. The generation and detection of currents, rather than voltage, enables circuitry having a low input impedance to be employed, which is resistant to external electrical interference. The use of a common current for row and column conductors enables a simple implementation within a small silicon area of a chip.

The current detector may comprise a comparison means arranged to compare the detected switch array current with the one or more reference currents by comparing a comparison current having one of a plurality of different comparison current magnitudes dependent on the detected switch array current with a threshold current having one or more different threshold current magnitudes dependent on the one or more reference currents. Likewise, the method may comprise comparing the detected switch array current with the one or more reference currents by comparing a comparison current having one of a plurality of different comparison current magnitudes dependent on the detected switch array current with a threshold current having one or more different threshold current magnitudes dependent on the one or more reference currents.

Therefore, a comparison may be made between the comparison current and the threshold current, either of which may be, but need not be, equal to, respectively, the detected switch array current and one of the one or more reference currents. This enables the comparison current and/or the threshold current to be smaller than respectively, the detected switch array current and any of the one or more reference currents, enabling conservation of power. The use of a switch array current that is relatively high can reduce susceptibility to received electrical interference.

The comparison current magnitudes may be arranged to take values intermediate of a plurality of the one or more threshold current magnitudes. This enables a high immunity to received electrical interference by providing an error margin for the comparison current magnitude and the one or more threshold current magnitudes, within which desired operation can be maintained.

The comparison means may be coupled to the one or more column interface ports by a switch array current mirroring means arranged to generate the comparison current by mirroring the detected switch array current. Likewise, the method may comprise generating the comparison current by mirroring the detected switch array current. This enables the comparison current to be closely matched for each of a plurality of column interface ports at each magnitude employed, and for the close matching to be maintained despite variations in temperature and integration process.

In one example, the comparison current magnitudes may be equal to the switch array current magnitudes. This enables a simple implementation, with the comparison current being identical to the detected switch array current, or with the comparison current being generated from the detected switch array current by employing, for example, current mirrors using transistors of equal dimensions, thereby giving a unity mirroring ratio.

In another example, the switch array current mirroring means may be arranged to apply scaling such that the comparison current magnitudes are equal to scaled down values of the switch current magnitudes. This enables reduced power consumption.

The current detector may comprise a selection means for selecting sequentially different ones of a plurality of the one or more reference currents, and the comparison means may be arranged to compare the comparison current with, sequentially, the threshold current having the different threshold current magnitudes dependent on the reference current magnitude of the selected reference current. Likewise, the method may comprise selecting sequentially different ones of a plurality of the one or more reference currents and comparing the comparison current with, sequentially, the threshold current having the different threshold current magnitudes dependent on the reference current magnitude of the selected reference current. This enables a simple implementation for detecting the presence of, and determining the magnitude of, the switch array current. Typically the comparison means may comprise a plurality of current comparators equal to the number of column interface ports, that is, the number of column conductors, and one of the current comparators may be coupled to each of the column interface ports.

The comparison means may be coupled to the selection means by a reference current mirroring means arranged to generate the threshold current by mirroring the selected reference current. Likewise, the method may comprise generating the threshold current by mirroring the selected reference current. This enables the threshold current supplied to the comparison means, or each of the current comparisons, to be closely matched at each threshold current magnitude employed, and for the close matching to be maintained despite variations in temperature and integration process. The use of mirroring enables current to be generated using a low chip area, by avoiding the need for high value resistors which occupy a large chip area.

In one example, the threshold current magnitude of the threshold current may be equal to the reference current magnitude of the selected reference current. This enables a simple implementation, with the threshold current being identical to the selected one of the reference currents, or with the threshold current being generated from the selected one of the reference currents by employing, for example, current mirrors using transistors of equal dimensions, thereby giving a unity mirroring ratio.

In another example, the threshold current magnitude of the threshold current may be equal to a magnitude of a scaled down version of the selected reference current. This enables reduced power consumption.

The current detector may comprise a counter for counting pulses of a clock signal and for controlling the selection means to select sequentially the different ones of the plurality of the one or more reference currents with sequentially increasing reference current magnitudes dependent on the count. Likewise, the method may comprise counting pulses of a clock signal and selecting sequentially the different ones of the plurality of the one or more reference currents with sequentially increasing reference current magnitudes dependent on the count. This enables a low complexity.

The current detector may be arranged to start the counter in response to detecting the switch array current flowing at any of the one or more column interface ports, and to stop the counter in response to detecting the threshold current having a smallest one of a plurality of the one or more threshold current magnitudes which exceeds the comparison current magnitude of the comparison current. Likewise, the method may comprise starting the counting in response to detecting the switch array current flowing at any of the one or more column conductors, and stopping the counting in response to detecting the threshold current having a smallest one of a plurality of the one or more threshold current magnitudes which exceeds the comparison current magnitude of the comparison current. This enables power consumption to be low, by operating the counter, or by counting, for only a period required to determine the magnitude of the switch array current.

The comparison means may comprise at least one current comparator comprising: a first comparator current mirror having a first comparator port for the threshold current and a second comparator port for a mirror of current at the first comparator port; a second comparator current mirror having a third comparator port for the comparison current and a fourth comparator port for a mirror of current at the third comparator port; a third comparator current mirror having a fifth comparator port coupled to the fourth comparator port and a sixth comparator port for a mirror of current at the fifth comparator port, wherein the sixth comparator port is coupled to the second comparator port; and a limiting means having a limiting means input coupled to the second comparator port and a limiting means output coupled to a current comparison means output of the current comparison means. Such a comparator architecture can have a low input impedance, increasing the immunity of the interface circuit to received electrical interference.

The current generator may comprise a reference current generation means arranged to generate the one or more reference currents by mirroring a first input current and a switch array current generation means arranged to generate the switch array current by mirroring a second input current. Likewise, the method may comprise generating each of the one or more reference currents by mirroring a first input current and generating the switch array current by mirroring a second input current. This enables the reference currents and the switch array current with different magnitudes to be generated having precise relative magnitudes, and for the relative magnitudes to be maintained despite variations in temperature and integration process. The reference current generation means and the switch array current generation means may comprise current mirrors, and currents having different magnitudes may be generated by employing transistors of different sizes for the current mirrors. In particular, the current generator may be arranged to apply scaling such that the switch array current magnitudes are equal to scaled up values of a magnitude of the second input current. This can reduce the susceptibility to received electrical interference by enabling the switch array current to be relatively high. In some embodiments, the second input current may be the first input current.

The current detector may comprise a key bounce protection circuit arranged to prevent the generation of the row indication in response to the switch array current having a pulse duration less than a threshold. Likewise, the method may comprise preventing the generation of the row indication in response to the switch array current having a pulse duration less than a threshold. This can reduce the occurrence of spurious output signals from the interface circuit, caused by electrical interference or key bounce.

The current detector may be arranged to generate a column indication indicative of which of the one or more column conductors a closed one of the switches is coupled to, dependent on which of the one or more column interface ports the detected switch array current is flowing at. Likewise, the method may comprise generating a column indication indicative of which of the one or more column conductors a closed one of the switches is coupled to, dependent on which of the one or more column conductors the detected switch array current is flowing at. In this way, the detected switch array current may be used to determine both the column conductor and row conductor that a closed one of the switches is coupled to.

There is also provided an electronic device comprising the interface circuit and the switch array.

BRIEF DESCRIPTION OF DRAWINGS

Preferred embodiments of the present disclosure will now be described, by way of example only, with reference to the accompanying drawings, in which.

DETAILED DESCRIPTION OF PREFERRED EMBODIMENTS

Figure 1:
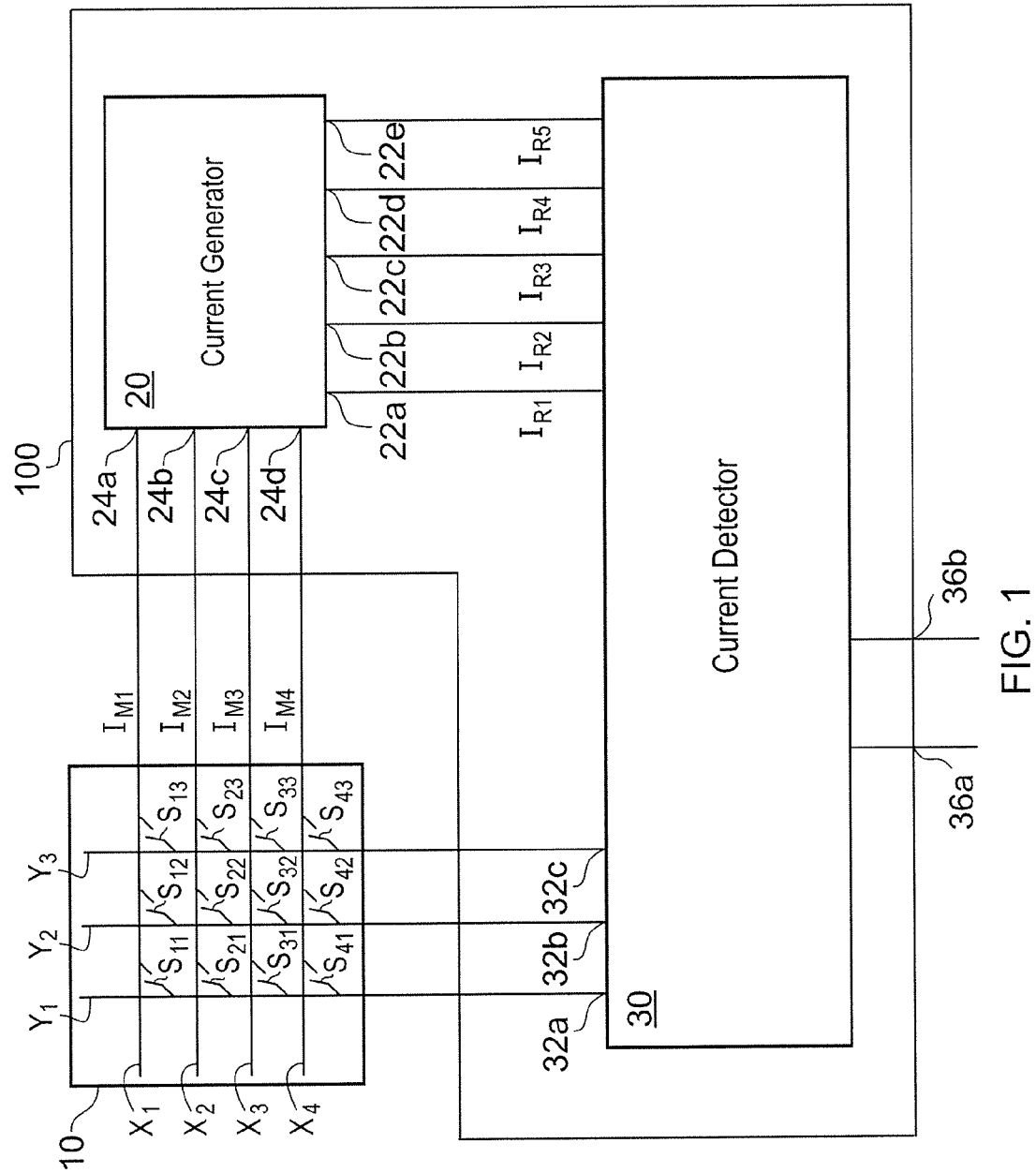
FIG. 1 is a block schematic diagram of an interface circuit coupled to a switch array.

Referring to FIG. 1, an interface circuit 100 in accordance with a preferred embodiment of the present disclosure is coupled to a switch array 10 having an array of switches $S_{ij}$, i=1 ... 4, j=1 ... 3. The switch array 10 has four row conductors $X_1 ... X_4$ and three column conductors $Y_1 ... Y_3$. Each of the switches $S_{ij}$ is coupled between one of the row conductors $X_1 ... X_4$ and one of the column conductors $Y_1 ... Y_3$. The switches $S_{ij}$ are normally non-conducting, and when activated, that is closed, provide a conduction path between the respective row conductor $X_1 ... X_4$ and column conductor $Y_1 ... Y_3$ to which they are coupled. Therefore, the array of switches $S_{ij}$, i=1 ... 4, j=1 ... 3 is arranged as a matrix.

The interface circuit 100 comprises a current generator 20 and a current detector 30. The current generator 20 generates a switch array current $I_M$ for application to the switch array 10. The current generator 20 has row interface ports 24a ... 24d which are coupled to respective row conductors $X_1 ... X_4$ of the switch array 10 and which deliver the switch array current $I_M$ to the respective row conductors $X_1 ... X_4$. The current detector 30 has column interface ports 32a, 32b, 32c which are coupled to different ones of the column conductors $Y_1 ... Y_3$ of the switch array 10 and which receive the switch array current $I_M$ from the column conductors $Y_1 ... Y_3$.

The flow of the switch array current $I_M$ is dependent on at least one of the switches $S_{ij}$ being closed, such that closure of one of the switches $S_{ij}$ allows the switch array current $I_M$ to flow. For example, if only switch $S_{12}$, which is coupled between row conductor $X_1$ and column conductor $Y_2$, is closed, the switch array current $I_M$ flows through row conductor $X_1$ and column conductor $Y_2$ to the column interface port 32b of the current detector 30. When none of the switches $S_{ij}$ is closed, the switch array current $I_M$ cannot flow. The current generator 20 does not need to deliver the switch array current $I_M$ while none of the switches $S_{ij}$ is closed, enabling power to be conserved, and when one of the switches $S_{ij}$ is closed, delivers the switch array current $I_M$ to only the row conductor $X_1 ... X_4$ to which the closed switch is coupled.

The switch array current $I_M$ can have any of a plurality of different switch array current magnitudes, depending on which row conductor $X_1 ... X_4$ the switch array current $I_M$ is applied to. To assist explanation, the switch array current $I_M$ having four different switch array current magnitudes is denoted respectively, $I_{M1}, I_{M2}, I_{M3}, I_{M4}$, with the switch array current $I_{M1}$ having a first switch array current magnitude M1 being applied to the first row conductor $X_1$, the switch array current $I_{M2}$ having a second switch array current magnitude M2 being applied to the second row conductor $X_2$, the switch array current $I_{M3}$ having a third switch array current magnitude M3 being applied to the third row conductor $X_3$, and the switch array current $I_{M4}$ having a fourth switch array current magnitude M4 being applied to the fourth row conductor $X_4$. Depending on which one of the switches $S_{ij}$ is closed, the switch array current $I_M$ having any of the first, second, third or fourth magnitudes M1, M2, M3, M4, can flow through any of the column conductors $Y_1 ... Y_3$ to any of the column interface ports 32a, 32b, 32c of the current generator 30.

The current generator 20 also generates reference currents $I_{R1} ... I_{R5}$. The reference currents $I_{R1} ... I_{R5}$ each have different reference current magnitudes R1 ... R5, that is, each of the reference currents $I_{R1} \ldots I_{R5}$ has a reference current magnitude R1 ... R5 that is different from the reference current magnitude R1 ... R5 of each of the other reference currents $I_{R1} \ldots I_{R5}$. The current generator 20 has reference current outputs 22a ... 22e which are coupled to respective inputs of the current detector 30 and which deliver the reference currents $I_{R1} \ldots I_{R5}$ to the current detector 30. The current detector 30 employs the reference currents $I_{R1} \ldots I_{R5}$ and the switch array current $I_M$ received at any one of the column interface ports 32a, 32b, 32c of the current detector 30 to determine, as described below, which one of the switches $S_{ij}$ is closed and to generate an indication of the closed switch $S_{ij}$.

In particular, the current detector 30 determines which column conductor $Y_1 \ldots Y_3$ the closed switch $S_{ij}$ is coupled to by detecting the presence of the switch array current $I_M$ flowing at any one of the column interface ports 32a, 32b, 32c. For this purpose, it is not necessary for the current detector 30 to be able to determine the switch array current magnitude M1 ... M4 of the detected switch array current $I_M$, but merely to be able to determine which of the column conductors $Y_1 \ldots Y_3$ is conducting current. The current detector 30 then generates a column indication at a column indication output 36a of the interface circuit 100 indicative of which column conductor $Y_1 \ldots Y_3$ the closed switch $S_{ij}$ is coupled to.

In addition, the current detector 30 determines the row conductor $X_1 \ldots X_4$ the closed switch $S_{ij}$ is coupled to by determining the switch array current magnitude M1 ... M4 of the switch array current $I_M$ received at the column interface ports 32a, 32b, 32c relative to the reference current magnitudes R1 ... R5 of the reference currents $I_{R1} \ldots I_{R5}$, by comparing the switch array current received at the column interface ports 32a, 32b, 32c with the reference currents $I_{R1} \ldots I_{R5}$, either directly or indirectly. Therefore, the reference current magnitudes R1 ... R5 of the reference currents $I_{R1} \ldots I_{R5}$ are used to define decision thresholds for determining the switch array current magnitude M1 ... M4 of the switch array current $I_M$ received at the column interface ports 32a, 32b, 32c. The current detector 30 then generates a row indication at a row indication output 36b of the interface circuit 100 indicative of which row conductor $X_1 \ldots X_4$ the closed switch $S_{ij}$ is coupled to. Further details about how the magnitudes are employed are provided below.

Figure 2:
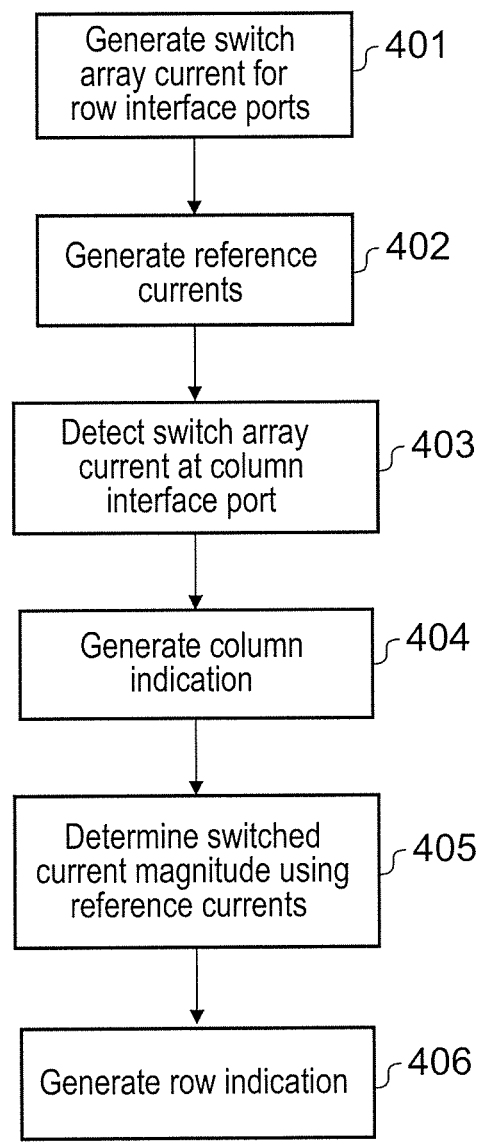
FIG. 2 is a flow chart illustrating the operation of an interface circuit.

A method of operating the interface circuit 100 when one of the switches $S_{ij}$ is closed is illustrated in the flow chart of FIG. 2. At step 401, the switch array current $I_M$ is generated for coupling to the row interface ports 24a ... 24d. The switch array current $I_M$ has a different one of the first, second, third and fourth switch array current magnitudes M1 ... M4 for different ones of the row interface ports 24a ... 24d. The switch array current $I_M$ is applied to, that is flows in, only the row interface port 24a ... 24d to which the closed switch $S_{ij}$ is coupled, as the other ones of the row interface ports 24a ... 24d are open circuit. At step 402, the reference currents $I_{R1} \ldots I_{R5}$ are generated, either simultaneously or sequentially, each having a different reference current magnitude R1 ... R5. At step 403, the switch array current $I_M$ flowing at any one of the column interface ports 32a ... 32c is detected. At step 404, dependent on which of the column interface ports 32a ... 32c the switch array current $I_M$ is detected as flowing in, a column indication indicative of which of the column conductors $Y_1 \ldots Y_3$ the closed switch $S_{ij}$ is coupled to is generated. At step 405, the magnitude of the detected switch array current $I_M$ is determined using the reference currents $I_{R1} \ldots I_{R5}$ to define decision thresholds, and by determining which one of the first, second, third and fourth switch array current magnitudes M1 ... M4 the detected switch array current $I_M$ has with respect to the decision thresholds. At step 406, dependent on the determined switch current magnitude M1 ... M4 of the detected switch array current $I_M$, a row indication indicative of which of the row conductors $X_1 \ldots X_4$ the closed switch $S_{ij}$ is coupled to is generated.

Figure 3:
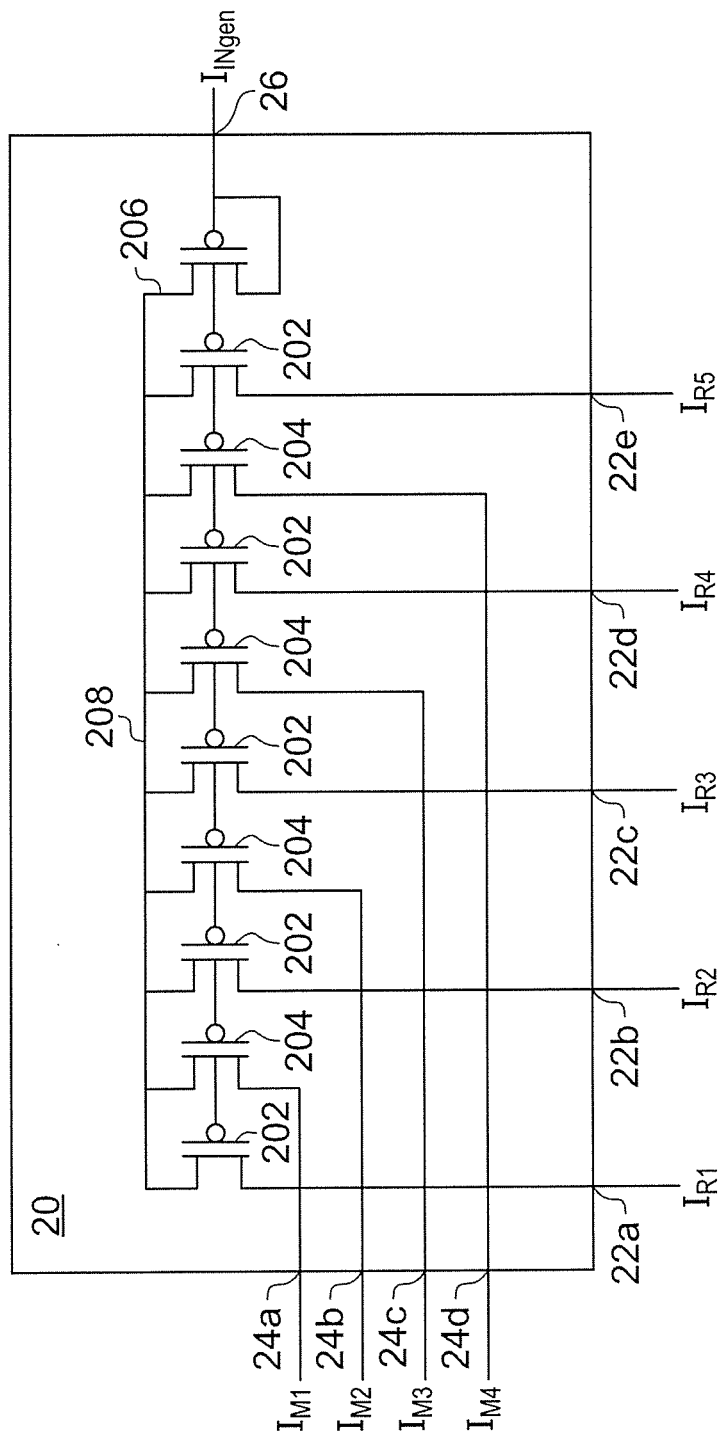
FIG. 3 is a block schematic diagram of a current generator.

An example of the current generator 20 is illustrated in FIG. 3. There is a current input 26 to the current generator 20 for a generator input current $I_{INgen}$. The generator input current $I_{INgen}$ may be generated within the interface circuit 100 or may be provided externally to the interface circuit 100. There are a plurality of reference current mirror transistors 202 each coupled to one of the reference current outputs 22a ... 22e of the current generator 20, and each arranged to generate one of the reference currents $I_{R1} \ldots I_{R5}$ by mirroring the generator input current $I_{INgen}$ through a current generator input transistor 206 arranged in a diode configuration. There are a plurality of switch array current mirror transistors 204 each coupled to one of the row interface ports 24a ... 24d of the current generator 20, and each arranged to generate the switch array current $I_M$ at a different magnitude by mirroring the generator input current $I_{INgen}$ through the current generator input transistor 206. The magnitudes of the reference currents $I_{R1} \ldots I_{R5}$ and of the switch array current $I_M$ may each be scaled up values of a magnitude of the generator input current $I_{INgen}$. Each of the reference current mirror transistors 202 and the switch array current mirror transistors 204 are coupled between a voltage rail 208 and the respective reference current outputs 22a ... 22e or row interface ports 24a ... 24d. The current generator input transistor 206 is coupled between the voltage rail 208 and the current input 26. A gate of each of the reference current mirror transistors 202, the switch array current mirror transistors 204 and the current generator input transistor 206 is coupled to the current input 26.

An example of the current detector 30 will now be described with reference to FIG. 4. A multiplexer (MUX) 302 has inputs for the reference currents $I_{R1} \ldots I_{R5}$ received from the current generator 20. The multiplexer 302 selects sequentially different ones of the reference currents $I_{R1} \ldots I_{R5}$ to deliver at a multiplexer output 303 of the multiplexer 302. The selection of the different ones of the reference currents $I_{R1} \ldots I_{R5}$ is determined by a counter 390 which is coupled to the multiplexer 302.

A current distributor 304 has an input coupled to the multiplexer output 303 for receiving the selected one of the reference currents $I_{R1} \ldots I_{R5}$, and delivers at each of a plurality of current distributor outputs 305 a threshold current $I_1$ dependent on the selected one of the reference currents $I_{R1} \ldots I_{R5}$. In one example, the current distributor 304 generates each instance of the threshold current $I_1$ by means of a respective current distributor current mirror transistor 306 which mirrors the selected one of the reference currents $I_{R1} \ldots I_{R5}$ through a current distributor input transistor 308 arranged in a diode configuration. Each of the current distributor current mirror transistors 306 are coupled between a ground 307 and the respective current distributor outputs 305. The current distributor input transistor 308 is coupled between the ground and the multiplexer output 303, and a gate of each of the current distributor current mirror transistors 306 and the current distributor input transistor 308 is coupled to the multiplexer output 303. The threshold current $I_1$ may be equal to the selected one of the reference currents $I_{R1} \ldots I_{R5}$, or may be a scaled version, in particular a scaled down version, of the selected one of the reference currents $I_{R1} \ldots I_{R5}$, such that the threshold current $I_1$ is proportional to, and smaller than, the selected one of the reference currents $I_{R1} \ldots I_{R5}$.

A first, second and third comparator 320a, 320b, 320c each have a first input 322a, 322b, 322c coupled to respective current distributor outputs 305 for receiving the threshold current $I_1$. The first, second and third comparators 320a, 320b, 320c each have a second input 324a, 324b, 324c coupled to the respective column interface ports 32a, 32b, 32c of the current detector 30 by means of a respective scaling current mirror 310a, 310b, 310c.

The threshold current $I_1$ is applied simultaneously and with equal magnitude to the respective first input 322a, 322b, 322c of each of the first, second and third comparators 320a, 320b, 320c. The comparison current $I_2$ is applied to the second input 324a, 324b, 324c of only one of the first, second and third comparators 320a, 320b, 320c at any one time, depending on which of the column conductors $Y_1 \ldots Y_3$ the switch array current $I_M$ is flowing in, and no current flows at the second input 324a, 324b, 324c of the other two of the first, second and third comparators 320a, 320b, 320c. In one example, the scaling current mirrors 310a, 310b, 310c provide scaling, in particular scaling down, such that the comparison current $I_2$ is proportional to, and smaller than, the switch array current $I_M$ at the respective column interface ports 32a, 32b, 32c. In another example, the scaling current mirrors 310a, 310b, 310c may employ a unity scaling factor, such that the comparison current $I_2$ is equal to the switch array current $I_M$ at the respective column interface ports 32a, 32b, 32c. Equivalently, instead of employing a unity scaling factor, the scaling current mirrors 310a, 310b, 310c may be omitted, and so the second inputs 324a, 324b, 324c of the first, second and third comparators 320a, 320b, 320c may be coupled directly to the respective column interface ports 32a, 32b, 32c. The first, second and third comparators 320a, 320b, 320c each have a respective output 326a, 326b, 326c for an indication of whether the threshold current $I_1$ applied to their respective first input 322a, 322b, 322c is larger or smaller than the current flowing at their respective second input 324a, 324b, 324c. Therefore, the threshold current $I_1$ at the respective first input 322a, 322b, 322c of each of the first, second and third comparators 320a, 320b, 320c defines a decision threshold.

To enable the current detector 30 to determine the switch array current magnitude M1 ... M4 of the switch array current $I_M$ received at the column interface ports 32a, 32b, 32c, relative to the reference current magnitudes R1 ... R5 of the reference currents $I_{R1} \ldots I_{R5}$, available magnitudes of the comparison current $I_2$, that is the comparison current magnitudes have a defined relationship with available magnitudes of the threshold current $I_1$, that is the threshold current magnitudes, and consequently the switch array current magnitudes M1 ... M4 have a defined relationship with the reference current magnitudes R1 ... R5. In the embodiment of FIG. 4, the available comparison current magnitudes are intermediate the available threshold current magnitudes, as illustrated in FIG. 5. FIG. 5 illustrates a current scale, with zero at the left hand side and current increasing in magnitude towards the right hand side. The available threshold current magnitudes and comparison current magnitudes are indicated by lines at points along the current scale, with the threshold current magnitudes being $A_1$, $A_3$, $A_5$, $A_7$ and $A_9$, and the comparison current magnitudes being $A_2$, $A_4$, $A_6$ and $A_8$, where $A_1 < A_2 < A_3 < A_4 < A_5 < A_6 < A_7 < A_8 < A_9$. Therefore, threshold current magnitudes $A_3$, $A_5$, $A_7$ and $A_9$ provide decision thresholds. If the comparison current $I_2$ has a magnitude smaller than the threshold current magnitude $A_3$, the comparison current $I_2$ can be determined to have the smallest of the comparison current magnitudes $A_2$, $A_4$, $A_6$ and $A_8$. If the comparison current $I_2$ has a magnitude larger than the threshold current magnitude $A_3$ but smaller than the threshold current magnitude $A_5$, the comparison current $I_2$ can be determined to have the second to smallest of the comparison current magnitudes $A_2$, $A_4$, $A_6$ and $A_8$. If the comparison current $I_2$ has a magnitude larger than the threshold current magnitude $A_5$ but smaller than the threshold current magnitude $A_7$, the comparison current $I_2$ can be determined to have the second to largest of the comparison current magnitudes $A_2$, $A_4$, $A_6$ and $A_8$. If the comparison current $I_2$ has a magnitude larger than the threshold current magnitude $A_7$ but smaller than the threshold current magnitude $A_9$, the comparison current $I_2$ can be determined to have the largest of the comparison current magnitudes $A_2$, $A_4$, $A_6$ and $A_8$. Preferably, each of the comparison current magnitudes $A_2$, $A_4$, $A_6$, $A_8$ are midway between the nearest lower and higher threshold current magnitudes $A_1$, $A_3$, $A_5$, $A_7$, $A_9$.

Figure 6:
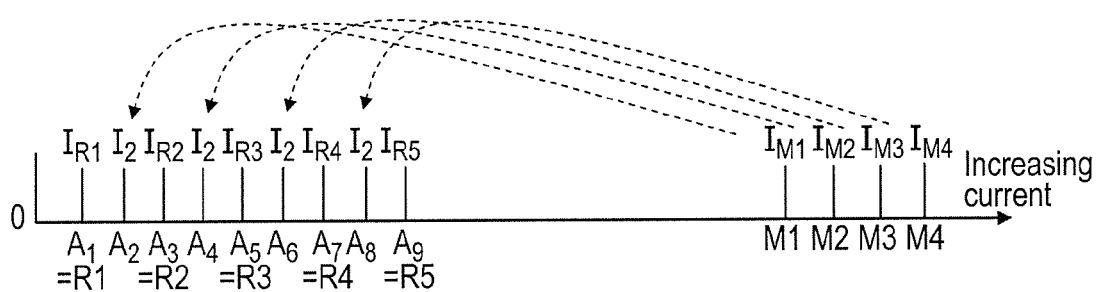
FIG. 6 is a diagram illustrating relative magnitudes of currents.

FIG. 6 illustrates current magnitudes for the case where the current distributor 304 does not perform scaling, such that the threshold current magnitudes $A_1$, $A_3$, $A_5$, $A_7$, $A_9$, are equal to the reference current magnitudes R1 ... R5. The reference current magnitudes R1 ... R5 increase from the smallest reference current $I_{R1}$ having reference current magnitude R1 through to the largest reference current $I_{R5}$ having reference current magnitude R5. Also in the example of FIG. 6, the scaling current mirrors 310a, 310b, 310c perform scaling down. In particular, the switch array current $I_M$ having switch array current magnitudes M1, M2, M3 and M4, or more specifically the switch array currents $I_{M1}$, $I_{M2}$, $I_{M3}$ and $I_{M4}$, are scaled down to the comparison current magnitudes $A_2$, $A_4$, $A_6$ and $A_8$ respectively.

Figure 7:
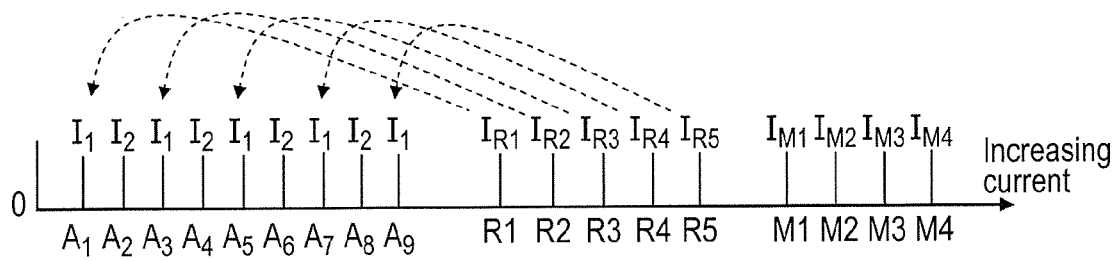
FIG. 7 is a diagram illustrating relative magnitudes of currents.

FIG. 7 illustrates current magnitudes for the case where the current distributor 304 and the scaling current mirrors 310a, 310b, 310c each perform scaling down, with the scaling factor employed by the current distributor 304 being smaller than the scaling factor employed by the scaling current mirrors 310a, 310b, 310c. In this example, the reference currents $I_{R1} \ldots I_{R5}$ having respective reference current magnitudes R1, R2, R3, R4 and R5 are scaled down to the threshold current magnitudes $A_1$, $A_3$, $A_5$, $A_7$ and $A_9$ respectively, and, as in FIG. 6, the switch array current $I_M$ having switch array current magnitudes M1, M2, M3 and M4 are scaled down to the comparison current magnitudes $A_2$, $A_4$, $A_6$ and $A_8$ respectively. The reference currents $I_{R1} \ldots I_{R5}$ having the different reference current magnitudes R1, R2, R3, R4 and R5, and the switch array current $I_M$ having the different switch array current magnitudes M1, M2, M3 and M4, may be generated by employing different size transistors for the reference current mirror transistors 202 and the switch array current mirror transistors 204.

In an initial quiescent condition when none of the switches $S_{ij}$ are closed, the counter 390 is not counting, the multiplexer 302 delivers the smallest reference current $I_{R1}$, resulting in the threshold current $I_1$ having the threshold current magnitude $A_1$, the switch array current $I_M$ does not flow, resulting in the comparison current $I_2$ being zero, and the outputs 326a, 326b, 326c of the first, second and third comparators 320a, 320b, 320c all deliver a binary 0 signal, indicating that the threshold current $I_1$ is larger than the comparison current $I_2$.

When one of the switches $S_{ij}$ is closed, the switch array current $I_M$ flows, resulting in, depending on which of the columns $Y_1$, $Y_2$, $Y_3$ the closed switch $S_{ij}$ is coupled to, an increase in the comparison current $I_2$ at the second input 324a, 324b, 324c of one of the first, second and third comparators 320a, 320b, 320c. As a result, the output 326a, 326b, 326c of the affected first, second or third comparator 320a, 320b, 320c changes to a binary 1 signal, indicating that the comparison current $I_2$ is larger than the threshold current $I_1$, for that comparator 320a, 320b, 320c. Therefore, the outputs 326a, 326b, 326c of the first, second and third comparators 320a, 320b, 320c together provide a digital word indicative of which of the columns $Y_1, Y_2, Y_3$ the closed switch $S_{ij}$ is coupled to. This digital word is a column indication and is delivered to the column indication output 36a of the interface circuit 100 via some intervening circuitry that is described below.

A first OR gate 350a has inputs 352 coupled to each of the outputs 326a, 326b, 326c of the first, second and third comparators 320a, 320b, 320c, and generates at an output 354 of the first OR gate 350a a binary 1 signal whenever any one of the outputs 326a, 326b, 326c of the first, second and third comparators 320a, 320b, 320c changes to a binary 1 signal, indicating that one of the switches $S_{ij}$ is closed. The output 354 of the first OR gate 350a is coupled to a start input 392 of the counter 390 by means of a switch bounce protection circuit 380. The switch bounce protection circuit 380 has an input 382 coupled to the output 354 of the first OR gate 350a. A first delay element 385 has an input coupled to the input 382 of the switch bounce protection circuit 380. A first AND gate (&) 384 has a first input coupled to the input 382 of the switch bounce protection circuit 380 and a second input coupled to an output of the first delay element 385. An output of the first AND gate 384 is coupled to an input of a first flip flop 386 for latching a signal at the output of the first AND gate 384, and an output of the first flip flop 386 is coupled to an output 388 of the switch bounce protection circuit 380. A binary 1 signal at the output 354 of the first OR gate 350a propagates through to the output 388 of the switch bounce protection circuit 380 provided it is present for a period exceeding a delay introduced by the first delay element 385. Otherwise, a binary 1 signal at the output 354 of the first OR gate 350a having a shorter duration is suppressed by the switch bounce protection circuit 380 and therefore does not appear at the output 388 of the switch bounce protection circuit 380. The binary 1 signal at the output 388 of the switch bounce protection circuit 380 provides a START signal which enables the counter 390 to commence counting pulses of a clock signal CLK provided at a clock input 396 of the counter. The clock signal CLK may be generated internally or externally to the interface circuit 100.

Second, third and fourth AND gates 330a, 330b, 330c each have a first input coupled to respective outputs 326a, 326b, 326c of the first, second and third comparators 320a, 320b, 320c and a second input coupled to the output 388 of the switch bounce protection circuit 380. An output of each of the second, third and fourth AND gates 330a, 330b, 330c is coupled to an input of respective second, third and fourth flip flops 340a, 340b, 340c, and outputs of the second, third and fourth flip flops 340a, 340b, 340c are coupled to the column indication output 36a. In operation, a binary 1 signal at the output 326a, 326b, 326c of any of the first, second and third comparators 320a, 320b, 320c propagates through the respective one of the second, third and fourth AND gates 330a, 330b, 330c to the respective one of the second, third and fourth flip flops 340a, 340b, 340c where it is latched, provided that it is of sufficient duration to propagate through the switch bounce protection circuit 380.

An output of the counter 390 is coupled to the multiplexer 303 and controls the multiplexer 303 to select the reference currents $I_{R1} \ldots I_{R5}$ in order of increasing magnitude, and therefore to cause the magnitude of the threshold current $I_1$ to increase in a stepwise manner. When the threshold current $I_1$ has a magnitude exceeding the magnitude of the comparison current $I_2$, the binary 1 signal at the respective output 326a, 326b, 326c of the first, second and third comparators 320a, 320b, 320c will revert to a binary 0 signal. Consequently, the outputs of the second, third and fourth AND gates 330a, 330b, 330c will each present a binary 0 signal. This condition is detected by a second OR gate 350b which has inputs coupled to the output of each of the second, third and fourth AND gates 330a, 330b, 330c, and an output of the second OR gate 350b is coupled to a stop input 394 of the counter 390, by means of a fifth flip flop 352 which latches the signal at the output of the second OR gate 350b to provide a STOP signal to stop the counter 390 from counting when the threshold current $I_1$ has a magnitude exceeding the magnitude of the comparison current $I_2$. When the counter 390 stops counting, the count value at its output is indicative of the row conductor $R_1 \ldots R_4$ to which the closed switch $S_{ij}$ is coupled. The count value at the output of the counter 390, which is a row indication, is coupled to the row indication output 36b of the interface circuit 100.

Figure 4:
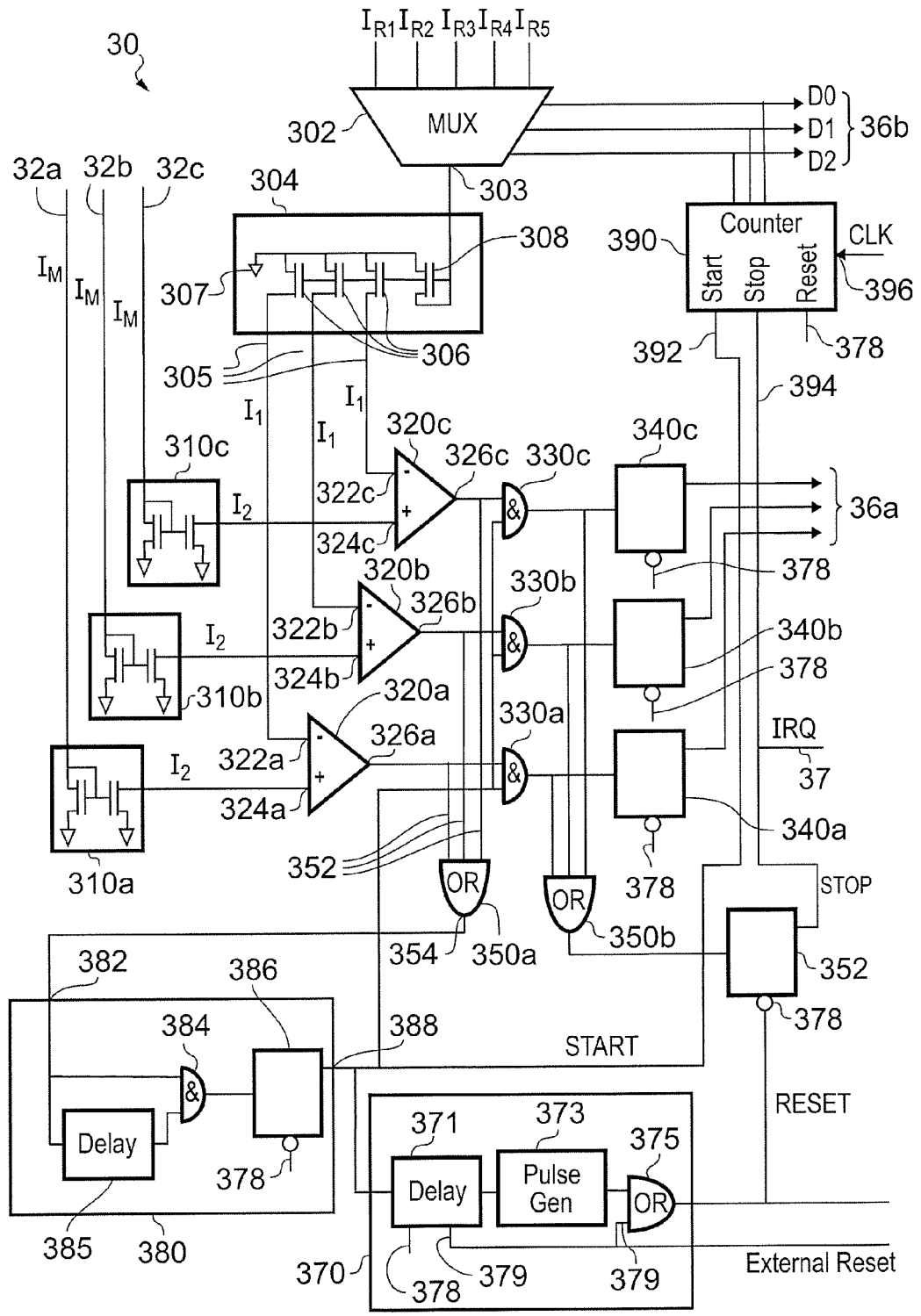
FIG. 4 is a block schematic diagram of a current detector.
Figure 5:
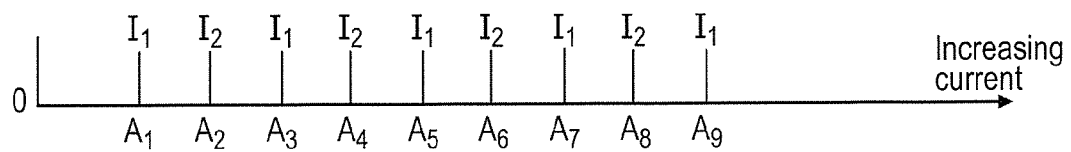
FIG. 5 is a diagram illustrating relative magnitudes of currents.

For example, in the embodiment of FIG. 4, the counter 390 has a three-bit output, with the three bits represented in FIG. 4 as D0, D1, and D2, with D0 being the least significant bit and D2 being the most significant bit. When the output count is binary 000, the multiplexer 303 selects the smallest reference current $I_{R1}$, having the reference current magnitude R1. If switch $S_{43}$ coupled to the fourth row conductor $X_4$ and third column conductor $Y_3$ is closed, then the switch array current $I_M$ having the switch array current magnitude M4 will flow, which, according to the scheme illustrated in FIGS. 6 and 7, results in the comparison current $I_2$ having the comparison current magnitude $A_8$. As the count value at the output of the counter 390 increases, the magnitude of the threshold current $I_1$ increases in a stepwise manner through the threshold current magnitudes $A_1, A_3, A_5, A_7, A_9$ until it reaches the threshold current magnitude $A_9$, which is the smallest threshold current magnitude exceeding the comparison current magnitude $A_8$ of the comparison current $I_2$. At this point, the output of the second OR gate 350 reverts from a binary 1 signal to a binary 0 signal, which causes the counter 390 to stop counting, having reached a count value of binary 100.

Referring to FIG. 4, the output of the fifth flip flop 352 is also coupled to an output 37, so that the STOP signal that stops the counter 390 from counting may also be used as an interrupt signal IRQ to prompt a non-illustrated processor to read the column indication at the column indication output 36a and the row indication at the row indication output 36b. Such a processor may be integral to the interface circuit 100 or external.

A reset circuit 370 has a second delay element 371 having an input coupled to the output 388 of the switch bounce protection circuit 380 and an output coupled to an input of a pulse generator 373. The pulse generator 373 has an output coupled to a first input of a third OR gate 375, and an output of the third OR gate 375 provides an output of the reset circuit 370. The output of the reset circuit 370 is coupled to reset inputs 378 of the counter 390, the first, second, third, fourth and fifth flip flops 386, 340a, 340b, 340c, 352 and the second delay element 371 thereby, in response to a binary 1 signal at the output 388 of the switch bounce protection circuit 308, providing a RESET signal for resetting these elements to their initial quiescent condition delivering binary 0 signals at their respective outputs, after a delay defined by the second delay element 371. For clarity, couplings between the output of the reset circuit 370 and the reset inputs 378 of the counter 390, the first, second, third and fourth flip flops 386, 340a, 340b, 340c, 352 and the second delay element 371 omitted from FIG. 4. The RESET signal at the output of the reset circuit 370 may also be coupled to other elements internal or external to the current detector 30, or internal or external to the interface circuit 100, if desired. Additionally, the second delay element 371 and the third OR gate 375 have a further reset input 379 for an external reset signal generated externally to the current detector 30 and either internally or externally to the interface circuit 100. For example, the external reset signal may be generated by the processor that reads the row and column indication outputs 36a, 36b.

Figure 8:
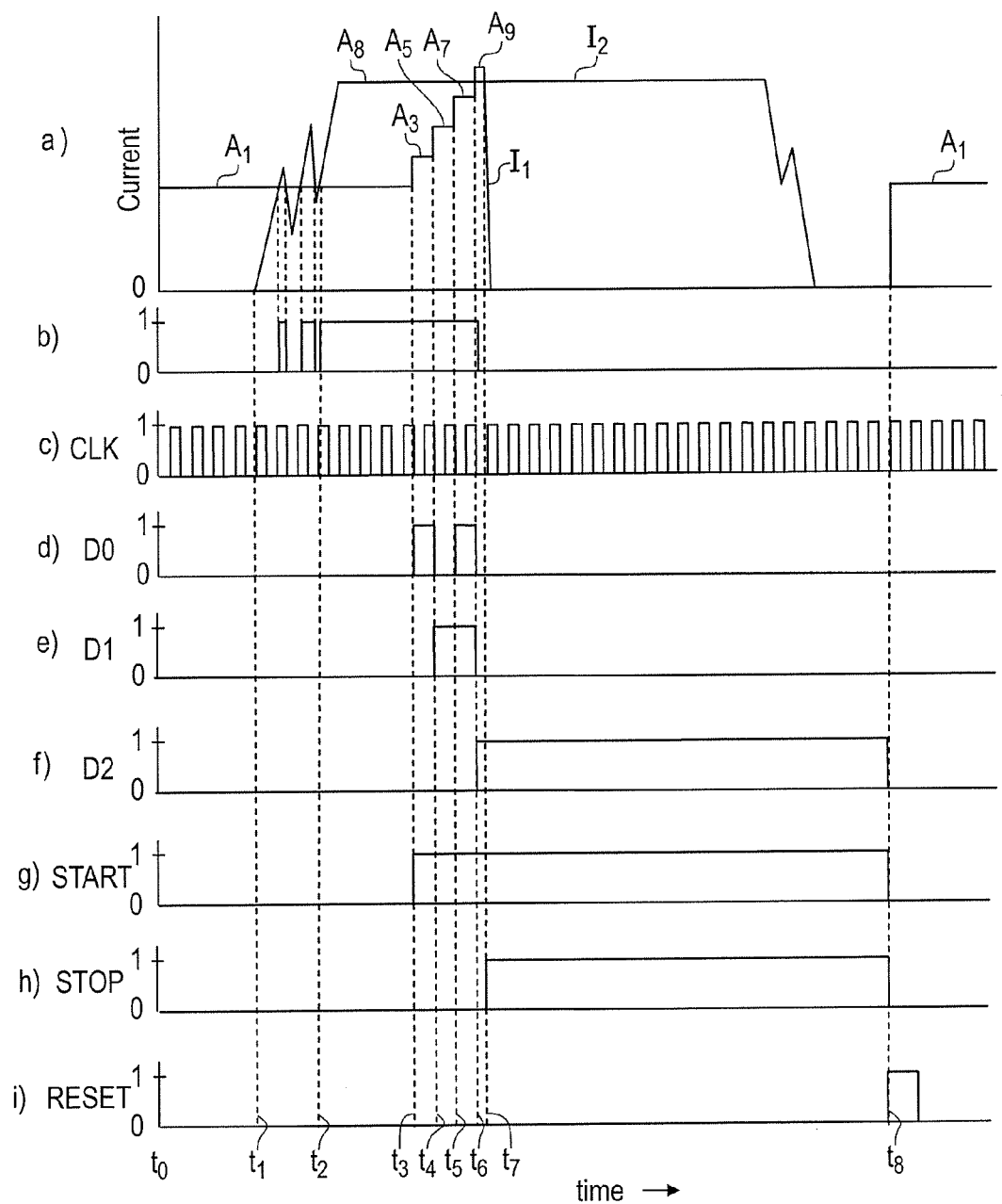
FIG. 8 is a timing diagram.

FIG. 8 illustrates the timing of currents and binary signals within the interface circuit 100. Graph a) shows the threshold current $I_1$, which has the lowest threshold current magnitude $A_1$ in the initial quiescent state at time $t_0$ when none of the switches $S_{ij}$ are closed, and the comparison current $I_2$ which is zero at time $t_0$. At time $t_1$ the switch $S_{43}$ is closed. The comparison current $I_2$ commences to flow, increasing gradually to the highest comparison current magnitude $A_8$. When the comparison current $I_2$ exceeds the threshold current $I_1$, the output of the third comparator 320c switches from a binary 0 signal to a binary 1 signal, as shown in graph b). Due to switch bounce, there is some transient variation of the comparison current $I_2$ which causes the output of the third comparator 320c to vary, but at time $t_2$ the output of the third comparator 320c becomes a steady binary 1 signal. Graph c) shows pulses of the clock signal CLK which the counter 390 counts, graph d) shows the least significant bit D0 at the output of the counter 390, graph e) shows the next least significant bit D1 at the output of the counter 390, graph f) shows the most significant bit D2 at the output of the counter 390, and graph g) shows the START signal. At time $t_3$ the counter 390 commences counting in response to the START signal, the delay between time $t_2$ and time $t_3$ being determined by the switch bounce protection circuit 380. Consequently, at time $t_3$ the least significant bit D0 at the output of the counter 390 switches to a binary 1, such that the output of the counter 390 delivers a binary value 001, and the threshold current $I_1$ switches to the second lowest threshold current magnitude $A_3$. At time $t_4$ the least significant bit D0 at the output of the counter 390 switches to a binary 0 and the next least significant bit D1 switches to a binary 1, such that the output of the counter 390 delivers a binary value 010, and the threshold current $I_1$ switches to the third lowest threshold current magnitude $A_5$. At time $t_5$ the least significant bit D0 switches to a binary 1, such that the output of the counter 390 delivers a binary value 011, and the threshold current $I_1$ switches to the fourth lowest threshold current magnitude $A_7$. At time $t_6$ the least significant bit D0 switches to a binary 0, the next least significant bit D1 switches to a binary 0, and the most significant bit D2 switches to a binary 1, such that the output of the counter 390 delivers a binary value 100, and the threshold current $I_1$ switches to the highest threshold current magnitude $A_9$. At this stage, the current detector 30 detects that the threshold current $I_1$ exceeds the comparison current $I_2$. After a short delay due to the propagation of signals within the interface circuit 100, at time $t_7$ the STOP signal switches to a binary 1 and the counter 390 stops counting, with the counter output bits D0, D1 and D2 being held at their current values to enable them to be read at the row indication output 36b before time $t_8$. Also during the period $t_7$ to $t_8$ the column indication output 36a is read. Also at time $t_7$, the threshold current $I_1$, is reduced to zero. At time $t_8$ the reset circuit 370 generates the RESET signal, which causes the output of the counter 390 to be reset to binary value 000, and the START and STOP signals to be reset to a binary 0. At this stage the interface circuit 100 returns to the initial quiescent condition.

Figure 9:
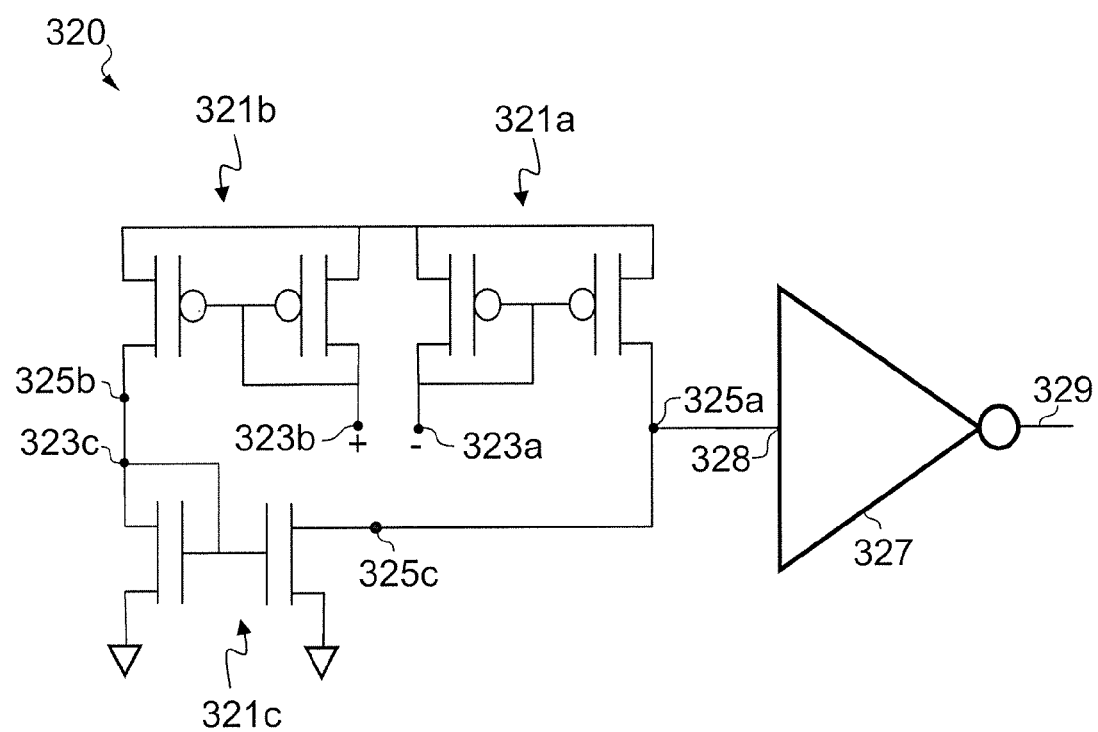
FIG. 9 is a block schematic diagram of a current comparator.

FIG. 9 illustrates an example embodiment of the first comparator 320a, and the second and third comparators 320b, 320c may have a similar structure. A first comparator current mirror 321a has a first comparator port 323a for the threshold current and a second comparator port 325a for a mirror of a current at the first comparator port 323a. A second comparator current mirror 321b has a third comparator port 323b for the comparison current $I_2$ and a fourth comparator port 325b for a mirror of a current at the third comparator port 323b. A third comparator current mirror 321c has a fifth comparator port 323c coupled to the fourth comparator port 325b and a sixth comparator port 325c for a mirror of a current at the fifth comparator port 323c. The sixth comparator port 325c is coupled to the second comparator port 325a. An inverter 327 has an inverter input 328 coupled to the second comparator port 325a and an inverter output 329 for coupling to the output 326a of the first comparator 320a. Instead of the inverter 327, more generally general any limiting device that provides a binary signal at its output indicative of whether a signal at its input is above or below a threshold level may be used. The limiting device, or limiter, may employ, for example, a high gain amplifier, and specifically a limiting amplifier. The limiting device need not provide inversion.

Figure 10:
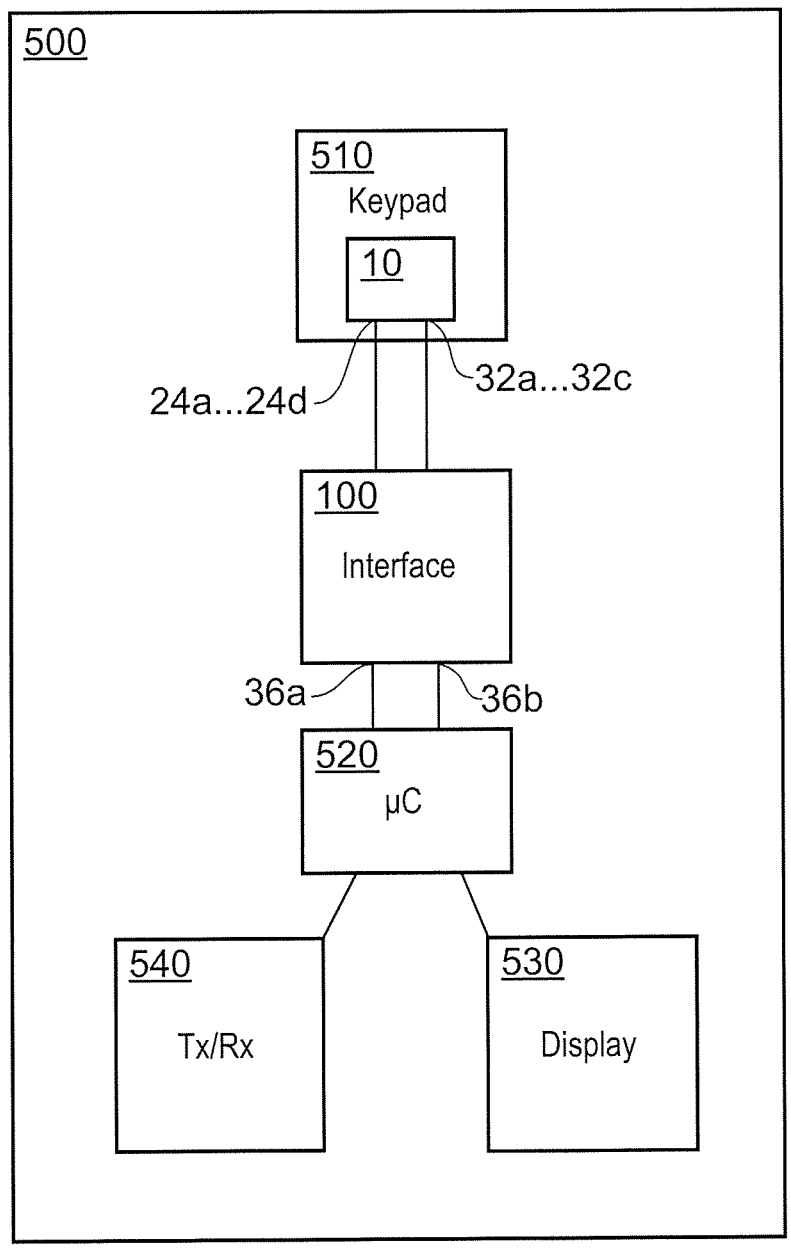
FIG. 10 is a block schematic diagram of an electronic device.

FIG. 10 illustrates an electronic device 500 comprising the interface circuit 100. The electronic device 500 has a microcontroller 520 for controlling the operation of the electronic device 500. A wireless transceiver 540 may be coupled to the microcontroller 520 to enable wireless communication between the electronic device 500 and non-illustrated external devices. A display 530 is coupled to the microcontroller 520 for displaying information to a user of the electronic device 500, and a keypad 510 enables the user to controller the operation of the electronic device 500. The keypad 510 comprises the switch array 10, and the switch array 10 is coupled to the interface circuit 100 by means of the row interface ports 24a . . . 24d and the column interface ports 32a, 32b, 32c. The interface circuit 100 is coupled to the microcontroller 520 by means of the column indication output 36a and the row indication output 36b for delivering the column indication and row indication to the microcontroller 520. Such an electronic device 500, may be, for example, a mobile telephone, personal audio player, broadcast receiver, a positioning device, a gaming device or a security device.

Although embodiments of the interface circuit 100 have been described for use with a switch array 10 having four row conductors $X_1 \ldots X_4$ and three column conductors $Y_1 \ldots Y_3$, the interface circuit 100, and the method of operating the interface circuit 100, is not limited to any particular number of row conductors $X_1 \ldots X_4$ or column conductors $Y_1 \ldots Y_3$.

Figure 11:
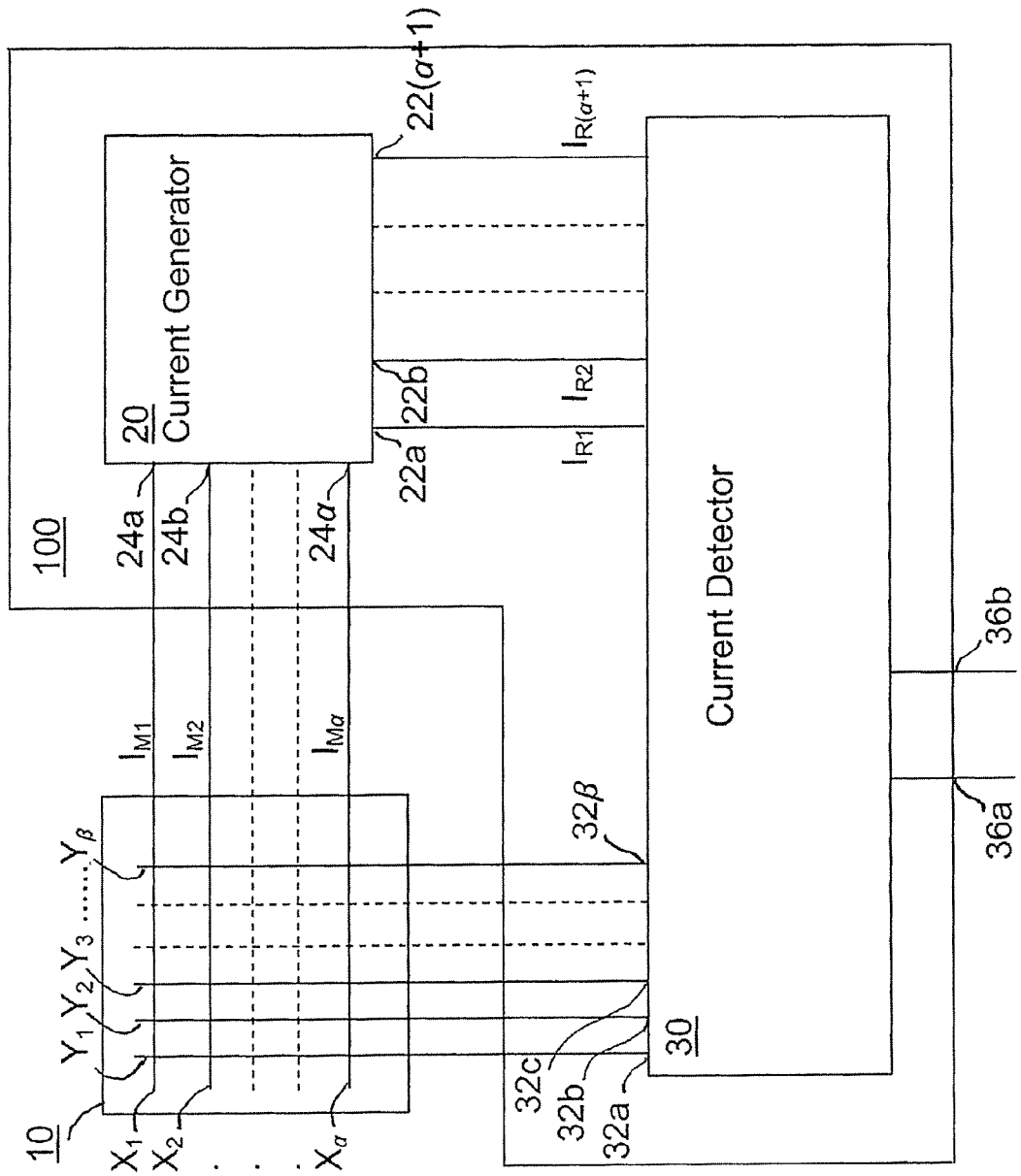
FIG. 11 is a block schematic diagram of an interface circuit coupled to a switch array.

FIG. 11 illustrates an embodiment of the interface circuit 100 for use with the switch array 10 having an arbitrary number $\alpha$ of row conductors $X_1 \ldots X_\alpha$, an arbitrary number $\beta$ of column conductors $Y_1 \ldots Y_\beta$, and an arbitrary number $\alpha \cdot \beta$ of switches $S_{ij}$, i=1 \ldots \alpha, j=1 \ldots \beta$. The current generator 20 generates switch array currents $I_{M1} \ldots I_{M\alpha}$, for application to the switch array 10. The current generator 20 has row interface ports 24a . . . 24α which are coupled to respective row conductors $X_1 \ldots X_\alpha$ of the switch array 10 and which deliver the switch array currents $I_{M1} \ldots I_{M\alpha}$ to the respective row conductors $X_1 \ldots X_\alpha$. The current detector 30 has column interface ports 32a . . . 32β which are coupled to respective column conductors $Y_1 \ldots Y_\beta$ of the switch array 10 and which receive the switch array current $I_{M1} \ldots I_{M\alpha}$ from the column conductors $Y_1 \ldots Y_\beta$. The current generator 20 also generates reference currents $I_{R1} \ldots I_{R(\alpha+1)}$. The current generator 20 has reference current outputs 22a . . . 22(α+1) which are coupled to respective inputs of the current detector 30 and which deliver the reference currents $I_{R1} \ldots I_{R(\alpha+1)}$ to the current detector 30. The current detector 30 employs the reference currents $I_{R1} \ldots I_{R(\alpha+1)}$ and the one of the switch array currents $I_{M1} \ldots I_{M\alpha}$ received at any one of the column interface ports 32a . . . 32β of the current detector 30 to determine a closed switch of the switch array 10.

In particular, the switch array 10 may have a single column conductor, that is, β=1. In this case, the current detector 30 may have a single one of the column interface ports (32a . . . 32c) and therefore does not need to determine which one of a plurality of the column interface ports (32a . . . 32c) the detected switch array current $I_M$ is flowing at, and therefore may not generate the column indication. In this case step 404 of FIG. 2 may be omitted.

In general, the required number of different reference current magnitudes (R1 . . . R5) is, at minimum, one less than the number of row conductors ($X_1$ . . . $X_4$) or row interface ports (24a . . . 24d). So, for example, if the interface circuit (100) has two row interface ports (24a . . . 24d), for coupling to two row conductors ($X_1$ . . . $X_4$), a single reference current magnitude ($R_1$ . . . $R_5$), and therefore a single reference current ($I_{R1}$ . . . $I_{R5}$), is sufficient to provide a single threshold current magnitude ($A_1, A_3, A_5, A_7, A_9$) and therefore provide a single decision threshold for distinguishing between two magnitudes of the comparison current ($I_2$). However, it is preferable to provide more than the minimum number of reference current magnitudes (R1 . . . R5) in order to provide a quiescent threshold current $I_1$ having a magnitude smaller than the smallest magnitude of the comparison current $I_2$, and to provide a threshold current $I_1$ having a magnitude larger than the largest magnitude of the comparison current $I_2$, in order to provide immunity from noise and to facilitate generation of the row indication and the column indication as described.

Figure 12:
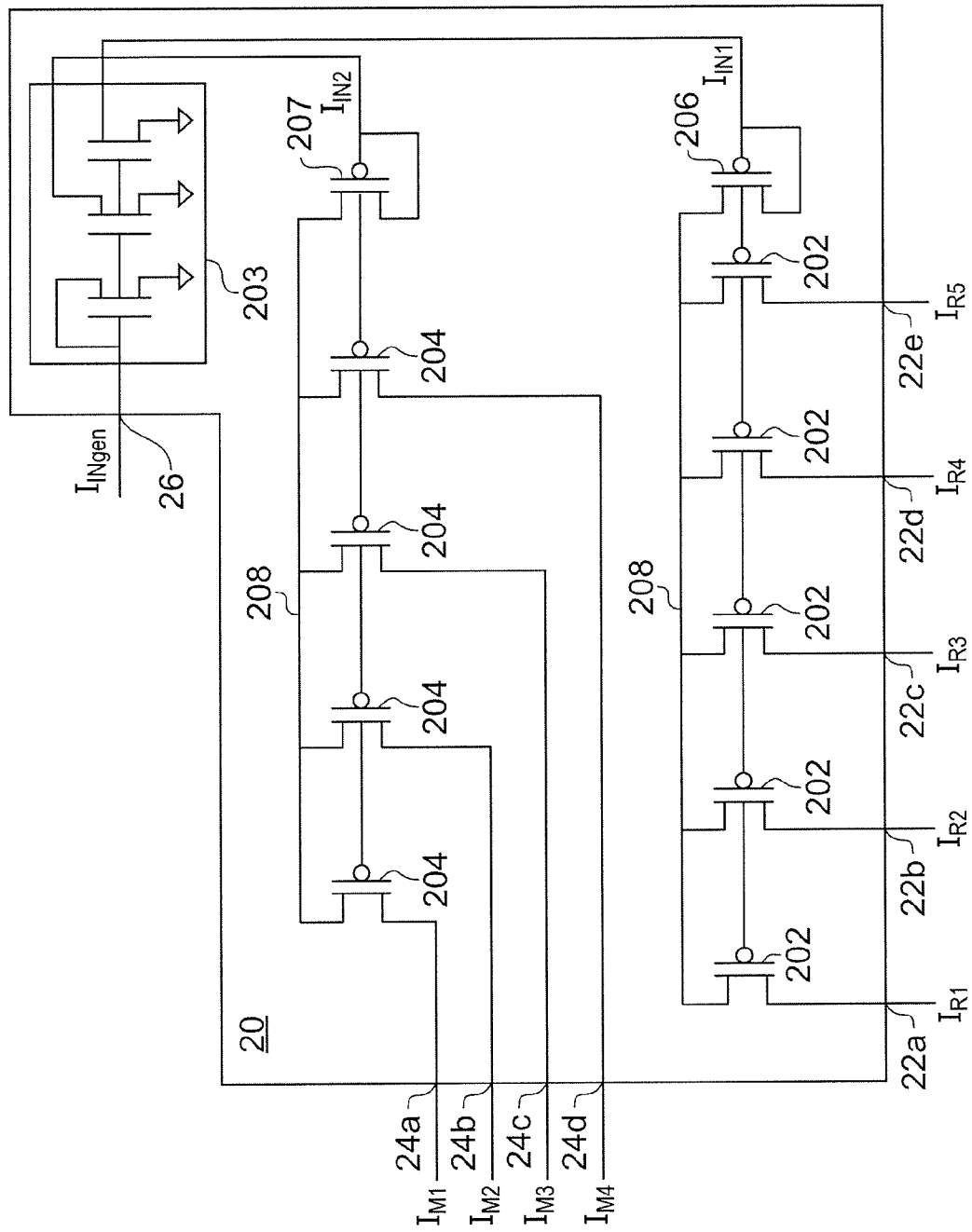
FIG. 12 is a block schematic diagram of an alternative current generator.

FIG. 12 illustrates an embodiment of the current generator 20 that may be used instead of the embodiment illustrated in FIG. 3, and which is particularly suited for use where the scaling current mirrors 310, 310b, 310c provide scaling down. In the embodiment of FIG. 12, the input 26 for the generator input current $I_{INgen}$ is coupled to a gate of the current generator input transistor 206 by means of a current mirror stage 203 which generates a first input current $I_{IN1}$ for delivery to the current generator input transistor 206, by mirroring the generator input current $I_{INgen}$. The current generator input transistor 206 is arranged in a diode configuration and is coupled between the voltage rail 208 and the current mirror stage 203. The reference current mirror transistors 202 are each coupled to one of the reference current outputs 22a . . . 22e of the current generator 20, and are each arranged to generate one of the reference currents $I_{R1}$ . . . $I_{R5}$ by mirroring the first input current $I_{IN1}$ through the current generator input transistor 206. The current mirror stage 203 is also coupled to a gate of a secondary current generator input transistor 207, which is also arranged in a diode configuration and is coupled between the voltage rail 208 and the current mirror stage 203. The current mirror stage 203 generates a second input current $I_{IN2}$ for delivery to the secondary current generator input transistor 207 by mirroring the generator input current $I_{INgen}$. Each of the switch array current mirror transistors 204 are coupled between the voltage rail 208 and the respective row interface ports 24a . . . 24d. A gate of each of the switch array current mirror transistors 204 and the secondary current generator input transistor 207 are coupled together and the switch array current mirror transistors 204 are each arranged to generate the switch array current $I_M$ at a different magnitude by mirroring the second input current $I_{IN2}$. The switch array current mirror transistors 204 in combination with the secondary current generator input transistor 207 may perform scaling, and in particular scaling up, such that the different magnitudes of the switch array current $I_M$ are equal to scaled values of a magnitude of the second input current $I_{IN2}$ and therefore are equal to scaled values of the magnitude of the generator input current $I_{INgen}$. Similarly, the magnitudes of the reference currents $I_{R1}$ . . . $I_{R5}$ may each be scaled values, and in particular scaled up values, of the magnitude of the generator input current $I_{INgen}$.

Although embodiments have been described in which the switch array current $I_M$ is applied to row conductors $X_1$ . . . $X_4$, the designation of the conductors of the switch array 10 as either a row conductor $X_1$ . . . $X_4$ or a column conductor $Y_1$ . . . $Y_3$ is intended to be arbitrary, provided that each of the switches $S_{ij}$ is arranged to couple one of the row conductors $X_1$ . . . $X_4$ to one of the column conductors $Y_1$ . . . $Y_3$, and the designation is not intended to imply any physical arrangement or orientation of the conductors. Therefore, the disclosure is applicable with the designation of row and column conductors interchanged.

Although embodiments have been described in which the term generate, when applied to a current, indicates the sourcing of the current, the disclosure is equally applicable where the term generate indicates sinking the current. In this context, the term generate, when applied to a current, is therefore intended to encompass both sourcing the current and sinking the current.

Although embodiments have been described in which a multiplexer 302 is employed for coupling sequentially different ones of the reference currents $I_{R1}$ . . . $I_{R5}$ to a plurality of current comparators (320a, 320b, 320c), alternatively, additional current comparators may be employed for coupling simultaneously to different ones of the reference currents.

The operation of the interface circuit 100 has been described for the circumstances in which only one of the switches $S_{ij}$ is closed. Additional provision may be included for detecting the simultaneous closure of more than one of the switches $S_{ij}$. For example, if more than one switch $S_{ij}$ coupled to the same one of the row conductors $X_1$ . . . $X_4$ but different ones of the column conductors $Y_1$ . . . $Y_3$ are closed simultaneously, the switch array current $I_M$ will flow simultaneously at more than one of the column interface ports 32a, 32b, 32c, resulting in a binary 1 signal at the output 326a, 326b, 326c of more than one of the current comparators. This circumstance may be detected within the interface circuit 100, and appropriate action taken, for example suppressing the column indication at the column indication output 36a and the row indication at the row indication output 36b, or an external device may detect this condition at the column indication output 36a. Similarly, if more than one switch $S_{ij}$ coupled to the same one of the column conductors $Y_1$ . . . $Y_3$ but different ones of the row conductors $X_1$ . . . $X_4$ are closed simultaneously, the switch array current $I_M$, and consequently the comparison current $I_2$, may have a magnitude outside of the expected values of the switch array current magnitude M1 . . . M4 and the comparison current magnitude $A_2, A_4, A_6, A_8$. This circumstance may be detected within the interface circuit 100, for example as an unexpectedly high count value, and appropriate action taken, for example suppressing the column indication at the column indication output 36a and the row indication at the row indication output 36b.

It will be understood that the embodiments described above are only examples and that modifications may be made to the embodiments without departing from the scope of the claims.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

The invention claimed is:

1. An interface circuit for a switch array having an array of switches each closeable to couple a row conductor of a plurality of row conductors to a column conductor of one or more column conductors, the interface circuit comprising:
   a current generator having a plurality of row interface ports for coupling to different ones of the row conductors and arranged to:
      generate a switch array current for coupling to the row interface ports, the switch array current having a different one of a plurality of different switch array current magnitudes for different ones of the row interface ports, and
      generate one or more reference currents each having a different reference current magnitude; and
   a current detector having one or more column interface ports for coupling to different ones of the one or more column conductors and arranged to:
      detect the switch array current flowing at any one of the one or more column interface ports, and
      generate a row indication indicative of which of the row conductors a closed one of the switches is coupled to by determining which one of the switch array current magnitudes the detected switch array current has by comparing the detected switch array current with the one or more reference currents.

2. An interface circuit as claimed in claim 1, wherein the current detector comprises a comparison means arranged to compare the detected switch array current with the one or more reference currents by comparing a comparison current having one of a plurality of different comparison current magnitudes dependent on the detected switch array current with a threshold current having one or more different threshold current magnitudes dependent on the one or more reference currents.

3. An interface circuit as claimed in claim 2, wherein the comparison current magnitudes are arranged to take values intermediate of a plurality of the one or more threshold current magnitudes.

4. An interface circuit as claimed in claim 2, wherein the comparison means is coupled to the one or more column interface ports by a switch array current mirroring means arranged to generate the comparison current by mirroring the detected switch array current.

5. An interface circuit as claimed in claim 2, wherein the comparison current magnitudes are equal to the switch array current magnitudes.

6. An interface circuit as claimed in claim 4, wherein the switch array current mirroring means is arranged to apply scaling such that the comparison current magnitudes are equal to scaled down values of the switch array current magnitudes.

7. An interface circuit as claimed in claim 2, wherein:
   the current detector comprises a selection means for selecting sequentially different ones of a plurality of the one or more reference currents; and
   the comparison means is arranged to compare the comparison current with, sequentially, the threshold current having the different threshold current magnitudes dependent on the reference current magnitude of the selected reference current.

8. An interface circuit as claimed in claim 7, wherein the comparison means is coupled to the selection means by a reference current mirroring means arranged to generate the threshold current by mirroring the selected reference current.

9. An interface circuit as claimed in claim 7, wherein the threshold current magnitude of the threshold current is equal to the reference current magnitude of the selected reference current.

10. An interface circuit as claimed in claim 7, wherein the current detector comprises a counter for counting pulses of a clock signal and for controlling the selection means to select sequentially the different ones of the plurality of the one or more reference currents with sequentially increasing reference current magnitudes dependent on the count.

11. An interface circuit as claimed in claim 10, wherein the current detector is arranged to start the counter in response to detecting the switch array current flowing at any of the one or more column interface ports, and to stop the counter in response to detecting the threshold current having a smallest one of a plurality of the one or more threshold current magnitudes which exceeds the comparison current magnitude of the comparison current.

12. An interface circuit as claimed in claim 2, wherein the comparison means comprises at least one current comparator comprising:
   a first comparator current mirror having a first comparator port for the threshold current and a second comparator port (325a) for a mirror of current at the first comparator port;
   a second comparator current mirror having a third comparator port for the comparison current and a fourth comparator port for a mirror of current at the third comparator port;
   a third comparator current mirror having a fifth comparator port coupled to the fourth comparator port and a sixth comparator port for a mirror of current at the fifth comparator port, wherein the sixth comparator port is coupled to the second comparator port; and
   a limiting means having a limiting means input coupled to the second comparator port and a limiting means output coupled to a current comparison means output of the current comparison means.

13. An interface circuit as claimed in claim 1, wherein the current generator comprises:
   a reference current generation means arranged to generate the one or more reference currents by mirroring a first input current; and
   a switch array current generation means arranged to generate the switch array current by mirroring a second input current.

14. An interface circuit as claimed in claim 13, wherein the current generator is arranged to apply scaling such that the switch array current magnitudes are equal to scaled up values of a magnitude of the second input current.

15. An interface circuit as claimed in claim 1, wherein the current detector comprises a key bounce protection circuit (380) arranged to prevent the generation of the row indication in response to the switch array current having a pulse duration less than a threshold.

16. An interface circuit as claimed in claim 1, wherein the current detector is arranged to generate a column indication indicative of which of the one or more column conductors a closed one of the switches is coupled to, dependent on which of the one or more column interface ports the detected switch array current is flowing at.

17. An electronic device comprising the interface circuit as claimed in claim 1 and the switch array.

18. A method of interfacing a switch array, the switch array having an array of switches each closeable to couple a row conductor of a plurality of row conductors to a column conductor of one or more column conductors, the method comprising:
- generating a switch array current for coupling to the plurality of row conductors, the switch array current having a different one of a plurality of different switch array current magnitudes for different ones of the row conductors;
- generating one or more reference currents each having a different reference current magnitude;
- detecting the switch array current flowing at any one of the one or more column conductors; and
- generating a row indication indicative of which of the row conductors a closed one of the switches is coupled to by determining which one of the switch array current magnitudes the detected switch array current has by comparing the detected switch array current with the one or more of reference currents.

* * * * *